(12) United States Patent
Onodera et al.

(10) Patent No.: US 9,981,541 B2
(45) Date of Patent: May 29, 2018

(54) PROTECTION STRUCTURE OF BATTERY MODULE MOUNTED IN REAR OF VEHICLE BODY

(71) Applicant: Fuji Jukogyo Kabushiki Kaisha, Tokyo (JP)

(72) Inventors: Yu Onodera, Tokyo (JP); Junya Okamura, Tokyo (JP); Takayuki Tokunaga, Tokyo (JP); Yasunori Mashio, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 101 days.

(21) Appl. No.: 14/660,013

(22) Filed: Mar. 17, 2015

(65) Prior Publication Data
US 2015/0273996 A1   Oct. 1, 2015

(30) Foreign Application Priority Data

Mar. 28, 2014 (JP) .................................. 2014-070252

(51) Int. Cl.
*B60K 1/04* (2006.01)
*B60L 11/18* (2006.01)
*H01M 2/10* (2006.01)

(52) U.S. Cl.
CPC ................ *B60K 1/04* (2013.01); *B60L 11/18* (2013.01); *H01M 2/1083* (2013.01); *B60K 2001/0416* (2013.01); *B60Y 2306/01* (2013.01); *H01M 2220/20* (2013.01)

(58) Field of Classification Search
CPC ... B60K 1/04; B60K 2001/0416; B60L 11/18; B60Y 2306/01; H01M 2/1083; H01M 2220/20; B62D 21/157; B62D 21/152
See application file for complete search history.

(56) References Cited

U.S. PATENT DOCUMENTS

| 7,717,207 | B2  | 5/2010  | Watanabe et al. |
| 7,921,951 | B2  | 4/2011  | Watanabe et al. |
| 8,051,934 | B2* | 11/2011 | Kiya ........................ B60K 1/04 180/274 |
| 8,616,319 | B2  | 12/2013 | Yokoyama et al. |
| 8,708,401 | B2* | 4/2014  | Lee ...................... B62D 21/152 280/124.109 |
| 2005/0121926 | A1* | 6/2005 | Montanvert ......... B62D 21/157 293/128 |

(Continued)

FOREIGN PATENT DOCUMENTS

| JP | 2004-262412 | * | 9/2004 | ............... B60K 1/04 |
| JP | 2005-247063 |   | 9/2005 |   |

(Continued)

*Primary Examiner* — Milton I Cano
*Assistant Examiner* — Michael Dignan
(74) *Attorney, Agent, or Firm* — Smith, Gambrell & Russell, LLP

(57) ABSTRACT

A battery module is mounted in the rear of a vehicle body and attached to at least one rear side frame extending rearward in the vehicle body such that the rear side module protrudes rearward beyond the battery module. One or a plurality of slope members is provided at the rear of the battery module. Each of the slope members forms a frontward rising inclined surface that protrudes above the rear side frame at the rear of the battery module.

20 Claims, 14 Drawing Sheets

OVERRIDING COLLISION (FIRST STAGE)

(56) References Cited

U.S. PATENT DOCUMENTS

| | | | | |
|---|---|---|---|---|
| 2008/0283316 A1* | 11/2008 | Ono | ................... | B60K 15/063 |
| | | | | 180/68.5 |
| 2009/0026802 A1* | 1/2009 | Imada | ................. | B62D 21/152 |
| | | | | 296/187.11 |
| 2014/0049070 A1* | 2/2014 | Young | .................... | B60K 1/04 |
| | | | | 296/187.12 |
| 2015/0133041 A1* | 5/2015 | Kiya | ....................... | B60K 1/04 |
| | | | | 454/69 |

FOREIGN PATENT DOCUMENTS

| | | |
|---|---|---|
| JP | 2006-335243 | 12/2006 |
| JP | 2007-015600 | 1/2007 |
| JP | 2011-194911 | 10/2011 |
| JP | 2012-006519 | 1/2012 |

* cited by examiner

FIG. 8
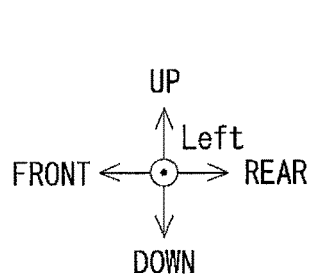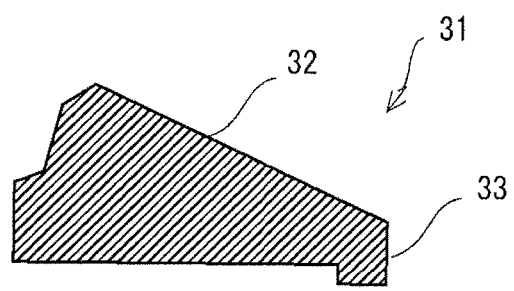

OVERRIDING COLLISION (FIRST STAGE)

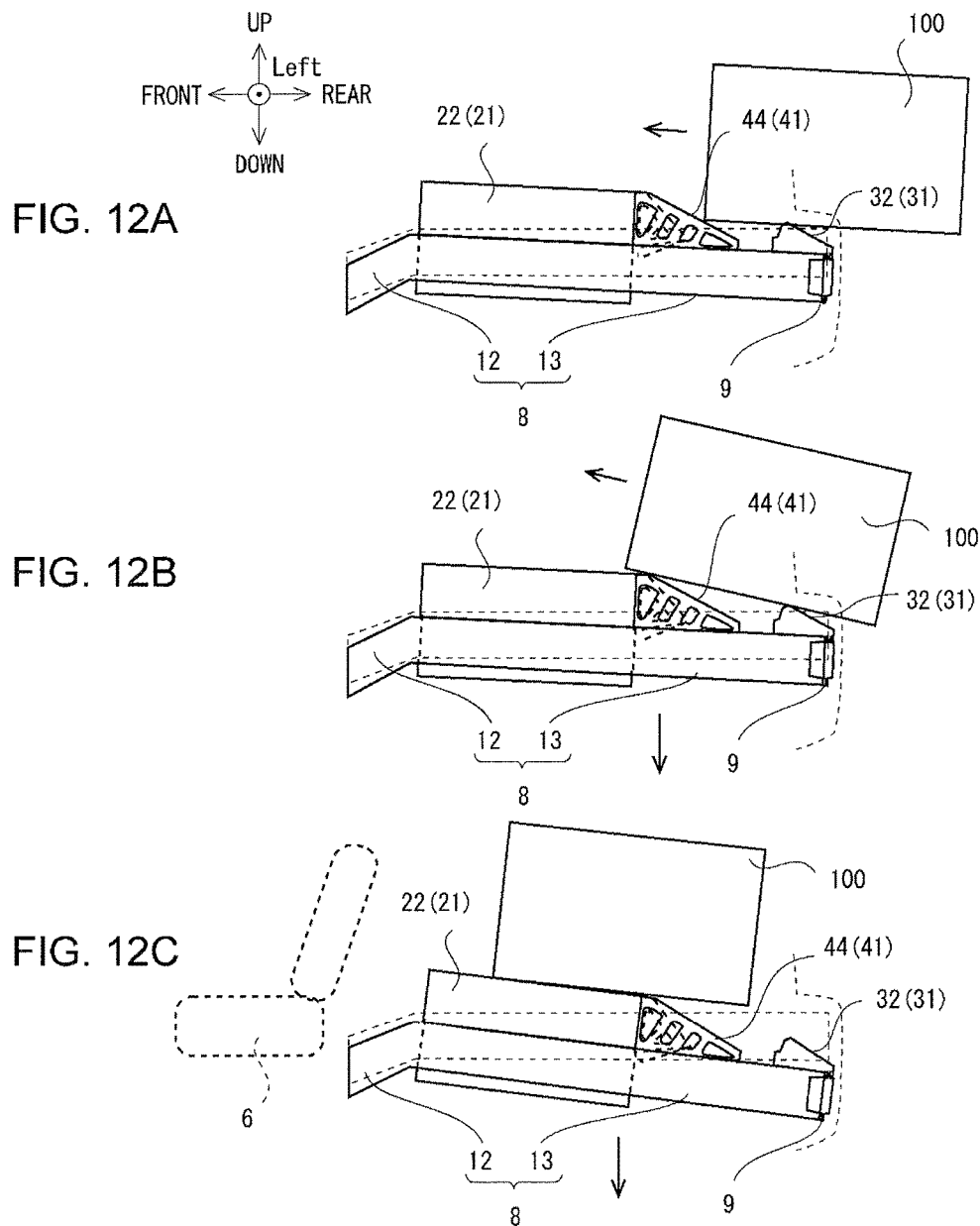

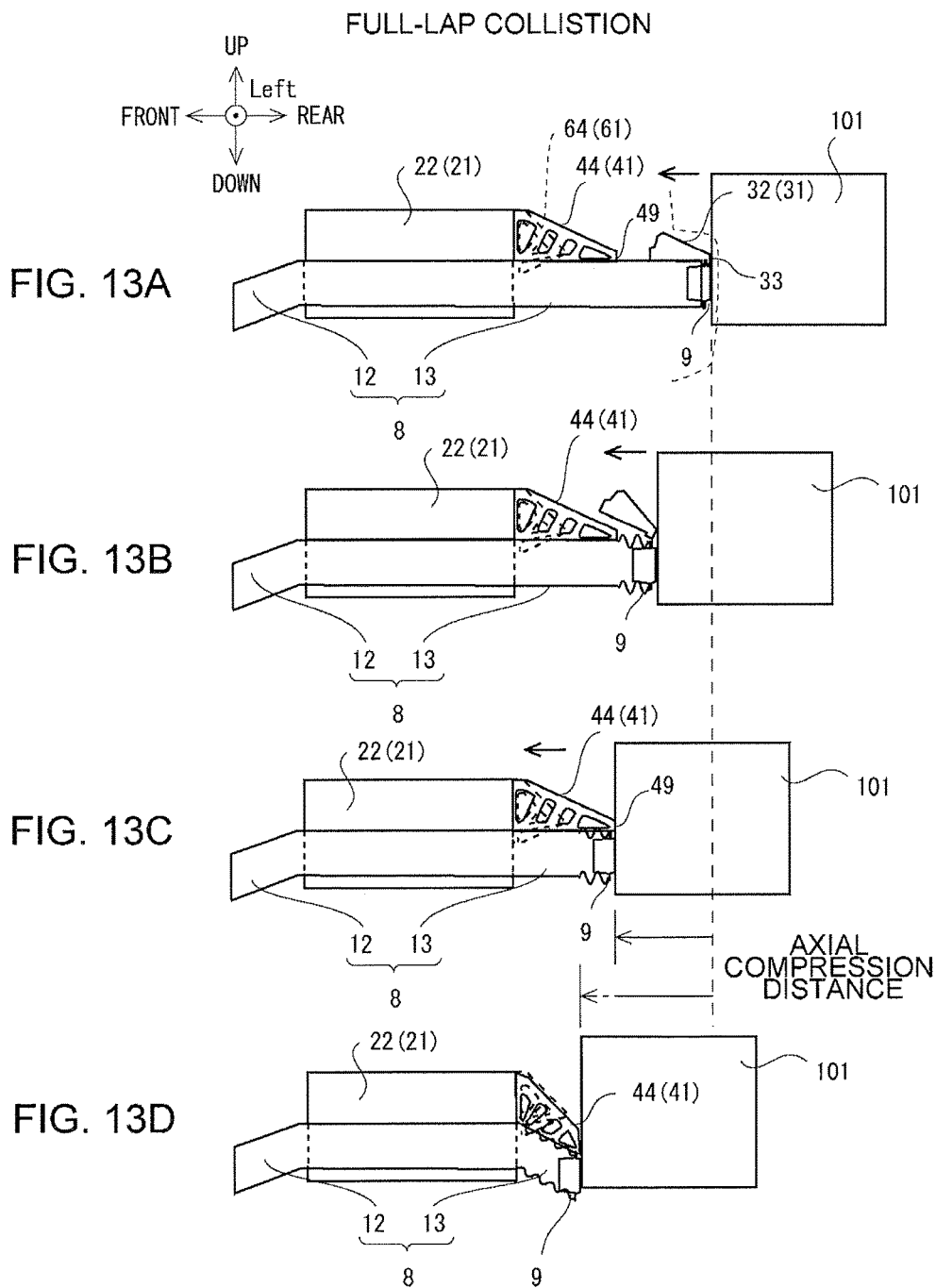

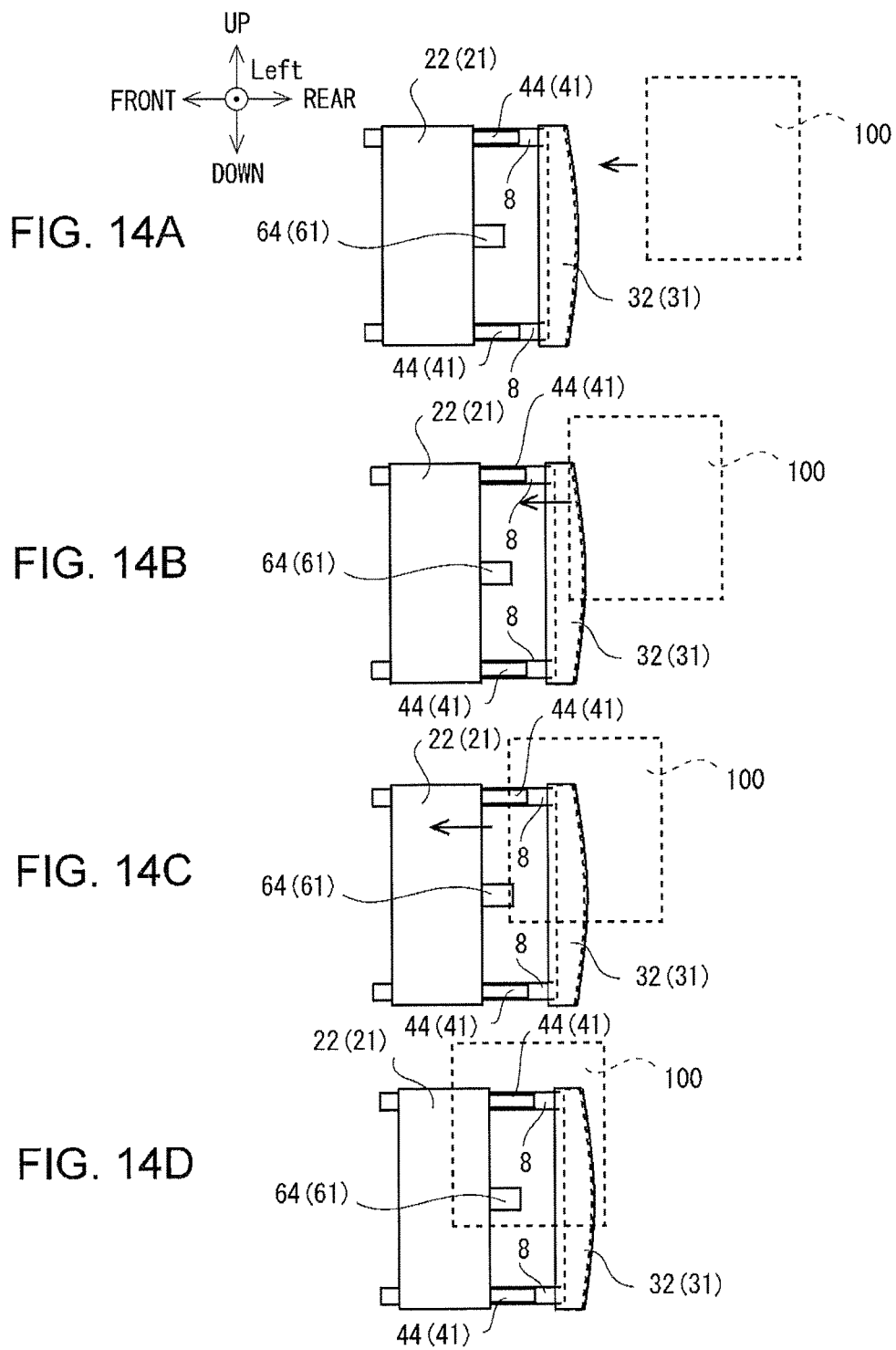

PROTECTION STRUCTURE OF BATTERY MODULE MOUNTED IN REAR OF VEHICLE BODY

CROSS-REFERENCE TO RELATED APPLICATIONS

The present application claims priority from Japanese Patent Application No. 2014-070252 filed on Mar. 28, 2014, the entire contents of which are hereby incorporated by reference.

BACKGROUND

1. Technical Field

The present invention relates to a protection structure of a battery module mounted in the rear of a vehicle body.

2. Related Art

These days, in the automobile industry, an electric vehicle and a hybrid electric vehicle that have a high output battery module mounted in a vehicle body and runs with stored electric power of the battery module are developed.

In Japanese Unexamined Patent Application Publication (JP-A) No. 2012-006519, the battery module is disposed between a pair of left and right rear side frames provided in the rear of the vehicle body. In this case, for example, when a following vehicle body running behind the vehicle body collides with the vehicle body, the following vehicle body collides with the rear end of the rear side frame, and the rear side frame is compressed along an axial direction with an applied force. With this, it is possible to absorb an impact at the time of the collision.

However, in the case where the battery module is provided in the rear of the vehicle body as in JP-A No. 2012-006519, it is possible to absorb the impact with the axial compression of the rear side frame when the following vehicle body collides with the rear end of the rear side frame as described above, but there are cases where the following vehicle body is a large vehicle such as, e.g., a truck or the like and the large vehicle body collides in an overriding state in which the large vehicle body is offset in an up and down direction relative to the rear side frame.

In the collision in the overriding state in which the vehicle body is offset in the up and down direction, the following vehicle body does not collide with the rear end of the rear side frame. As a result, the rear side frame is not compressed in the axial direction with the applied force at the time of the collision, and there is a possibility that the following vehicle body of which the impact is not absorbed moves into the vehicle body to reach a mounting position of the battery module.

To cope with this, in a conventional vehicle body, the battery module mounted in the rear of the vehicle body needs to be formed to have a size and a shape that do not allow the battery module to protrude above the rear side frame. As a result, the capacity of the battery module mounted in the rear of the vehicle body is limited. Realistically, it is difficult to adopt a structure in which a large-capacity battery module protruding above the rear side frame is mounted in the rear of the vehicle body by appropriately utilizing a space in the rear of the vehicle body such as a trunk or the like.

Thus, in the vehicle body of an automobile or the like, it is desired to relieve the limitation on the capacity of the battery module while securing collision safety performance of the battery module mounted in the rear.

SUMMARY OF THE INVENTION

An aspect of the present invention provides a protection structure of a battery module mounted in the rear of a vehicle body including: at least one rear side frame extending rearward in the vehicle body; and one or a plurality of slope members. The battery module is attached to the rear side frame such that the at least one rear side frame protrudes rearward beyond the battery module. The one or the plurality of slope members is disposed at the rear of the battery module, and the one or the plurality of slope members forms a frontward rising inclined surface that protrudes above the rear side frame at the rear of the battery module.

The vehicle body may have a plurality of the rear side frames that are disposed in a width direction of the vehicle body, and a rear bumper beam that couples rear ends of the rear side frames and extends in the width direction of the vehicle body, the battery module is attached to the rear side frame such that the battery module lays across the plurality of rear side frames. The one or the plurality of slope members may include a first slope member. The first slope member may be provided at a position spaced apart from and behind the battery module, on a rear frame that includes the rear side frames and the rear bumper beam at the rear of the battery module, and form a first inclined surface that extends from a rear end upper edge of the rear frame so as to rise frontward. The first inclined surface may protrude above the rear frame.

The one or the plurality of slope members may include at least one second slope member. The at least one second slope member is provided on at least one the rear side frames behind the battery module, and forms a second inclined surface that extends from an upper surface of the rear side frame so as to rise frontward, and the second inclined surface protrudes above the rear frame.

The one or the plurality of slope members may include a third slope member. The third slope member may be provided between the plurality of rear side frames so as to protrude rearward from the rear of the battery module, and form a third inclined surface that extends so as to rise frontward. The third inclined surface may protrude beyond the rear frame.

The battery module may protrude above the upper surfaces of the plurality of rear side frames. The second inclined surface of the second slope member may protrude above the rear frame at a height corresponding to a rear end upper edge of the battery module.

The battery module may protrude above the upper surfaces of the plurality of rear side frames. The third inclined surface of the third slope member may protrude above the rear frame at a height corresponding to a rear end upper edge of the battery module.

The slope member may be formed of a resin material that is more fragile than the rear side frame, and have: a frame that includes an inclined surface portion in which the frontward rising inclined surface is formed and that forms a substantially triangular cross-sectional shape in a cross section of the vehicle body in a front and rear direction; and a plurality of supports that extend downward or downward and frontward from the inclined surface portion and couple the inclined surface portion of the frame and the other portion. The plurality of supports may be disposed at an interval in the front and rear direction inside the frame having the substantially triangular cross-sectional shape.

The slope member may be formed with a load receiving surface that extends along an up and down direction of the vehicle body at a rear end of the frame that forms the substantially triangular cross-sectional shape.

The slope member may be formed with a fragile portion at a portion, other than the inclined surface portion, of the frame that forms the substantially triangular cross-sectional shape.

BRIEF DESCRIPTION OF THE DRAWINGS

FIG. 8 is a cross-sectional view of a rear end slope member of FIG. 2;

FIGS. 12A-12C are explanatory views of the deformation of the vehicle body at the time of the vertically offset overriding collision (second stage);

FIGS. 13A to 13D are an explanatory views of the deformation of the rear of the vehicle body at the time of a full-lap collision; and FIGS. 14A to 14D are explanatory views of a laterally offset overriding collision.

DETAILED DESCRIPTION

Hereinbelow, a vehicle according to an implementation of the present invention will be described with reference to the drawings.

Figure 1:
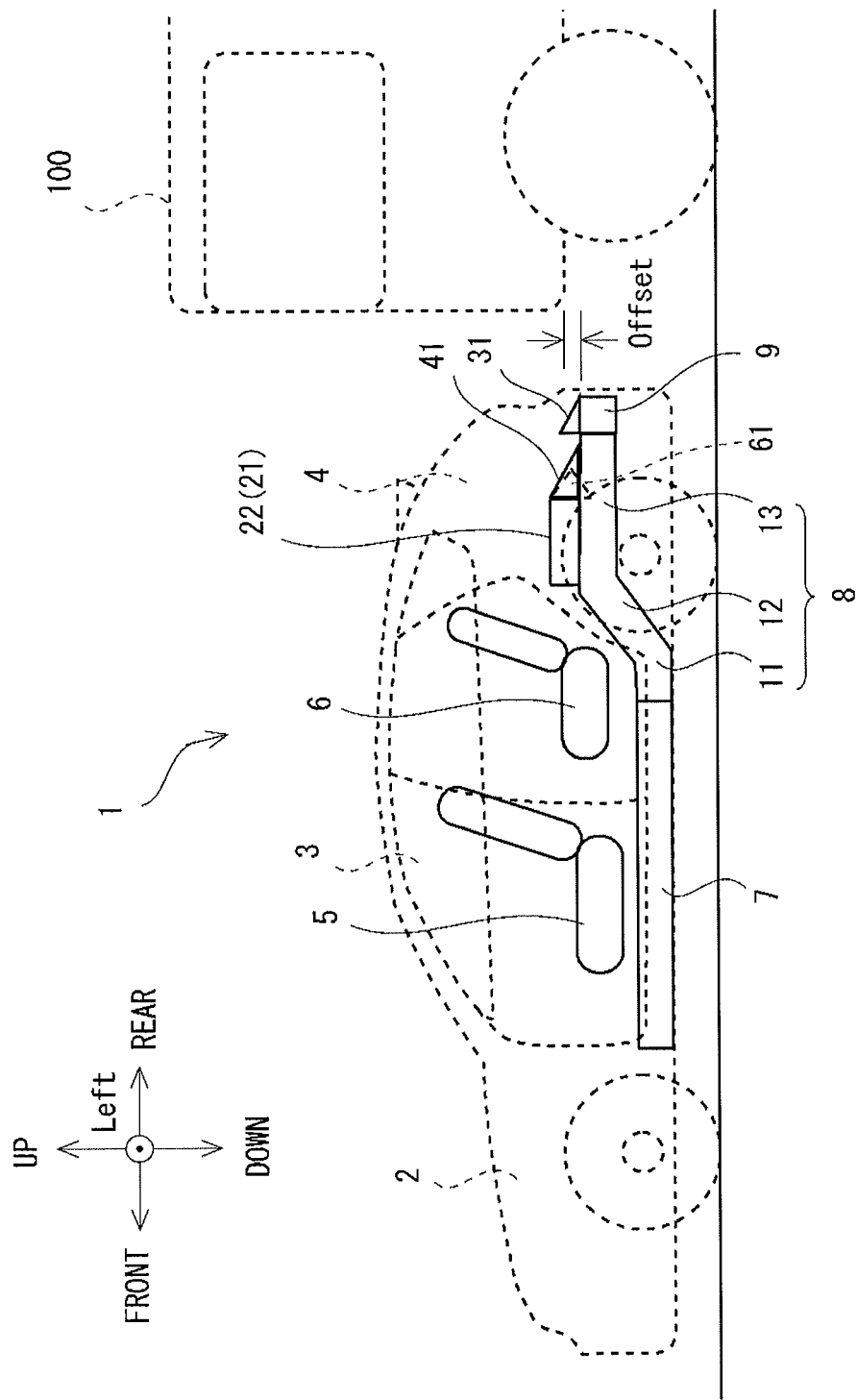
FIG. 1 is an explanatory view of a vehicle body 1 of an automobile according to an implementation of the present invention when viewed from the side.

FIG. 1 is an explanatory view of a vehicle body 1 of an automobile according to the implementation of the present invention when viewed from the side. The automobile is an example of the vehicle.

FIG. 1 also illustrates a large vehicle body 100 of a truck or the like as the vehicle body of a following vehicle that runs behind the automobile according to the implementation.

The vehicle body 1 of FIG. 1 is the vehicle body 1 of a hybrid automobile or an electric automobile. In the vehicle body 1 of FIG. 1, a large-capacity battery module 21 is mounted in the rear of the vehicle body 1.

In addition, in the vehicle body 1 of FIG. 1, a front compartment 2, a passenger compartment 3, and a trunk 4 are defined by a frame as a frame member thereof. In the front compartment 2, for example, an engine is disposed. In the passenger compartment 3, a front seat 5 and a rear seat 6 are disposed in two rows in a front and rear direction.

FIG. 1 illustrates, as frame members, side sills 7 that extend in the front and rear direction along left and right sides of a floor panel that defines a floor surface of the passenger compartment 3, rear side frames 8 that extend from the rear ends of the side sills 7 to the rear end of the vehicle body 1, and a rear bumper beam 9 that couples the rear ends of a pair of the left and right rear side frames 8 disposed in a width direction of the vehicle body 1 and extends in the width direction of the vehicle body 1.

Each rear side frame 8 has, from the front side, an attachment portion 11 that is attached to the side sill 7, an upper curve 12 that is curved upward from the attachment portion 11, and a rear extended portion 13 that is extended toward the rear of the vehicle body 1 from the upper curve 12. A rear cross member (not illustrated) that supports rear wheels is attached between the rear extended portions 13 of the pair of the left and right rear side frames 8.

In the hybrid automobile or the electric automobile, in order to drive a drive motor to thereby cause the vehicle body 1 to run, a battery that stores electricity is used. A large number of the batteries are put in a battery module case 22, and are mounted in the vehicle body 1 as the battery module 21.

In FIG. 1, the battery module 22 is attached to the pair of the left and right rear side frames 8 in a state in which the battery module 22 is placed on the pair of the left and right rear side frames 8. The battery module 22 is attached to the base end sides (front sides) of the rear extended portions 13 of the pair of the rear side frames 8 in a state in which the rear side frames 8 protrude rearward beyond the battery module case 22.

By disposing the battery module 21 in the rear of the vehicle body 1 in this manner, the capacity of the battery module 21 may be increased by utilizing the space of the trunk 4. For example, as illustrated in FIG. 1, the large-capacity battery module 21 that protrudes above the rear side frames 8 may be obtained.

Incidentally, in the case where the battery module 21 is disposed in the rear of the vehicle body 1 in this manner, when the vehicle body of the following vehicle collides with the vehicle body 1, it is necessary to protect the battery module 21 from the collision or the like. It is necessary to avoid particularly the deformation of the battery module case 22 and a direct hit on the battery module case 22 as much as possible. Unlike a spare tire mounted in the rear of the vehicle body, it is necessary to avoid the deformation of the battery module case 22 as much as possible.

For example, in the case where the vehicle body of the following vehicle is that of a passenger car similar to the vehicle body 1 of FIG. 1, a front bumper beam of the vehicle body of the following vehicle abuts on the rear bumper beam 9 of the vehicle body 1 of FIG. 1. In this case, a portion of the rear side frame 8 that protrudes rearward beyond the battery module case 22 is compressed along an axis in the front and rear direction of the rear side frame 8, and it is thereby possible to absorb the impact. It is possible to absorb the impact of the collision before the vehicle body of the following vehicle having collided therewith reaches the mounting position of the battery module 21 and make the vehicle body of the following vehicle less likely to collide with the battery module 21.

In contrast to this, for example, as illustrated in FIG. 1, in the case where the large vehicle body 100 of the truck or the like collides, the large vehicle body 100 collides in an overriding state in which the large vehicle body 100 is vertically offset relative to the rear side frame 8. Accordingly, in the collision in the overriding state, the rear side frame 8 is not compressed in its axial direction with the load of the vehicle body of the following vehicle having collided therewith. In this case, the impact of the vehicle body of the following vehicle having collided therewith is not absorbed and the vehicle body of the following vehicle could be pushed into the vehicle body 1 to reach the mounting position of the battery module case 22.

To cope with this, in the case where the battery module 21 is mounted in the rear of the vehicle body 1, the battery module 21 is preferably formed to have a size and a shape that do not allow the battery module 21 to protrude above the rear side frame 8. With this, at the time of an overriding collision, the vehicle body of the following vehicle having collided therewith can be prevented from directly colliding with the battery module case 22.

However, in the case where the battery module 21 is formed so as not to protrude above the rear side frame 8, the capacity of the battery module 21 is extremely limited. It is not possible to mount the large-capacity battery module case 22 in the rear of the vehicle body 1 by appropriately utilizing the space such as the trunk 4 in the rear of the vehicle body 1 or the like.

In addition, only reducing the height of the battery module 21 to thereby avoid the direct hit may allow the following vehicle body of which the impact is not absorbed to move into the vehicle body 1 to reach the mounting position of the battery module.

Thus, in the vehicle body 1 of the automobile or the like, it is desired to relieve the limitation on the capacity of the battery module 21 while securing collision safety performance of the battery module 21 mounted in the rear of the vehicle body 1.

To cope with this, in the present implementation, the battery module 21 is formed to have a size and a shape that allow the battery module 21 to protrude above the rear side frame 8 so that the capacity of the battery module 21 is increased, and a structure for protecting the battery module 21 is provided at a position at the rear of the battery module 21.

Specifically, a plurality of slope members 31, 41, and 61 that protrude above the rear side frames 8 and have frontward rising inclined surfaces is provided on the rear side frames 8 and the rear bumper beam 9. Each of the frontward rising inclined surfaces is formed so as to protrude above the rear side frame 8 at a height corresponding to the upper edge of the battery module case 22 that protrudes above the rear side frame 8.

With this, the vehicle body of the following vehicle having collided therewith becomes less likely to directly collide with the battery module 21 that protrudes above the rear side frame 8.

Hereinbelow, a detailed description will be given.

Figure 2:
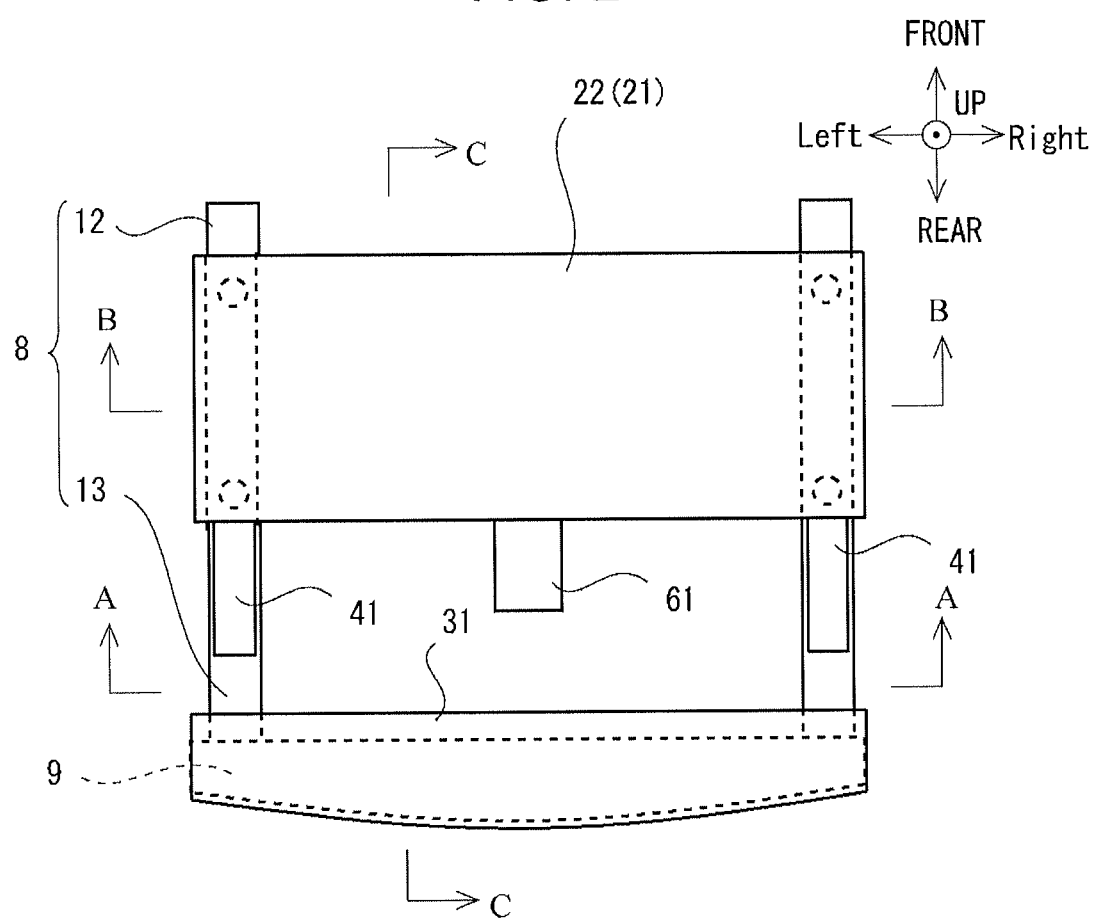
FIG. 2 is an explanatory view of a rear frame and a battery module provided in the rear of the vehicle body of FIG. 1 when viewed from above.

FIG. 2 is an explanatory view of a rear frame and the battery module case 22 provided in the rear of the vehicle body 1 of FIG. 1 when viewed from above. Herein, the rear frame denotes the pair of the left and right rear side frames 8 and the rear bumper beam 9.

Figure 3:
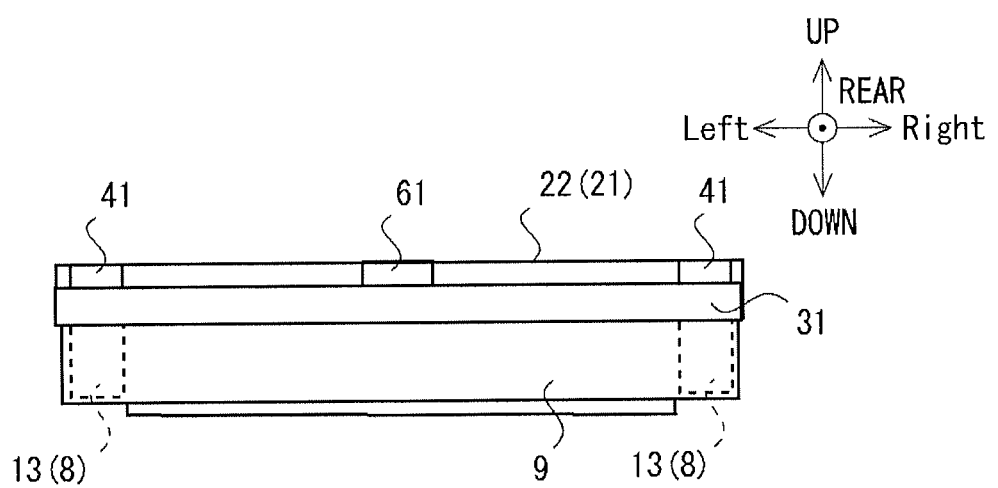
FIG. 3 is an explanatory view of rear side frames and the battery module case of FIG. 2 when viewed from the rear.
Figure 4:
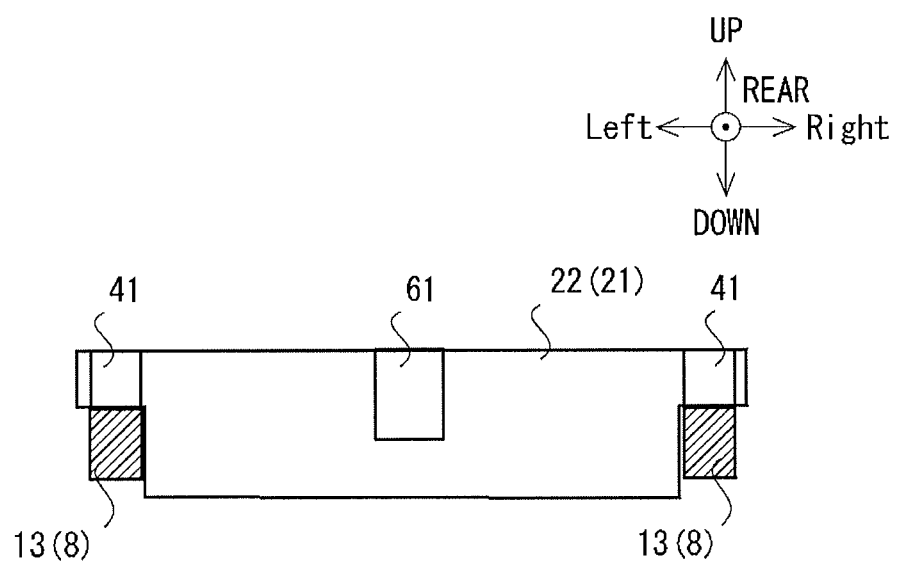
FIG. 4 is an A-A cross-sectional view of the rear side frames and the battery module case of FIG. 2.
Figure 5:
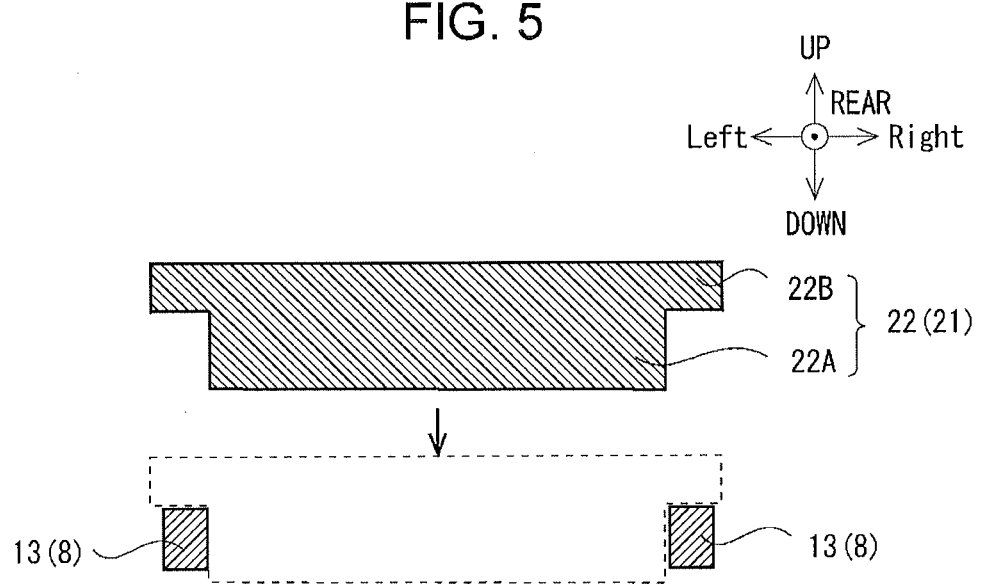
FIG. 5 is a B-B cross-sectional view of the rear side frames and the battery module case of FIG. 2.

FIG. 3 is an explanatory view of the rear side frames 8 and the battery module case 22 of FIG. 2 when viewed from the rear. FIG. 4 is an A-A cross-sectional view of the rear side frames 8 and the battery module case 22 of FIG. 2. FIG. 5 is a B-B cross-sectional view of the rear side frames 8 and the battery module case 22 of FIG. 2. In FIG. 5, the battery module case 22 is detached from the rear side frames 8.

Figure 6:
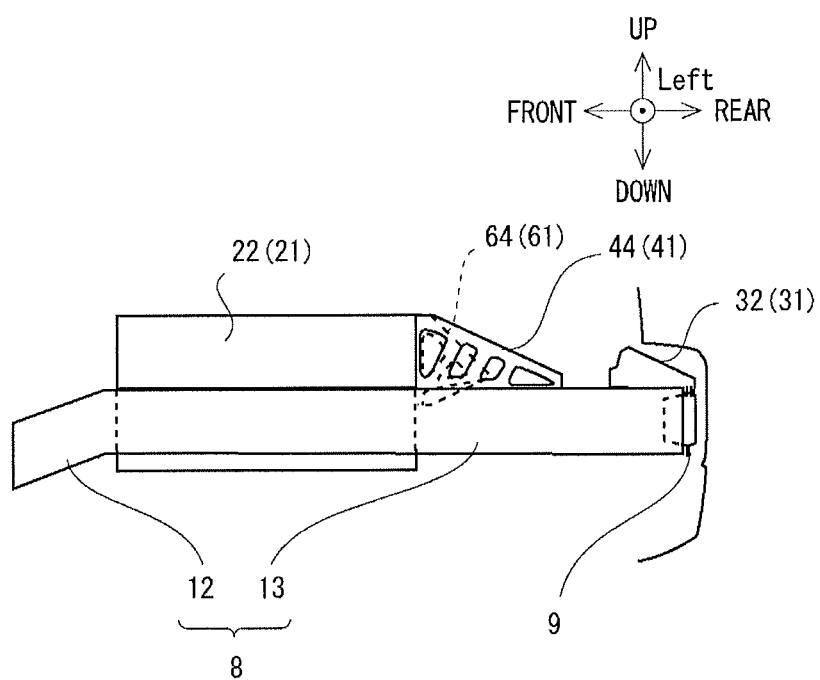
FIG. 6 is an explanatory view of the rear side frame and the battery module case of FIG. 2 when viewed from the side.
Figure 7:
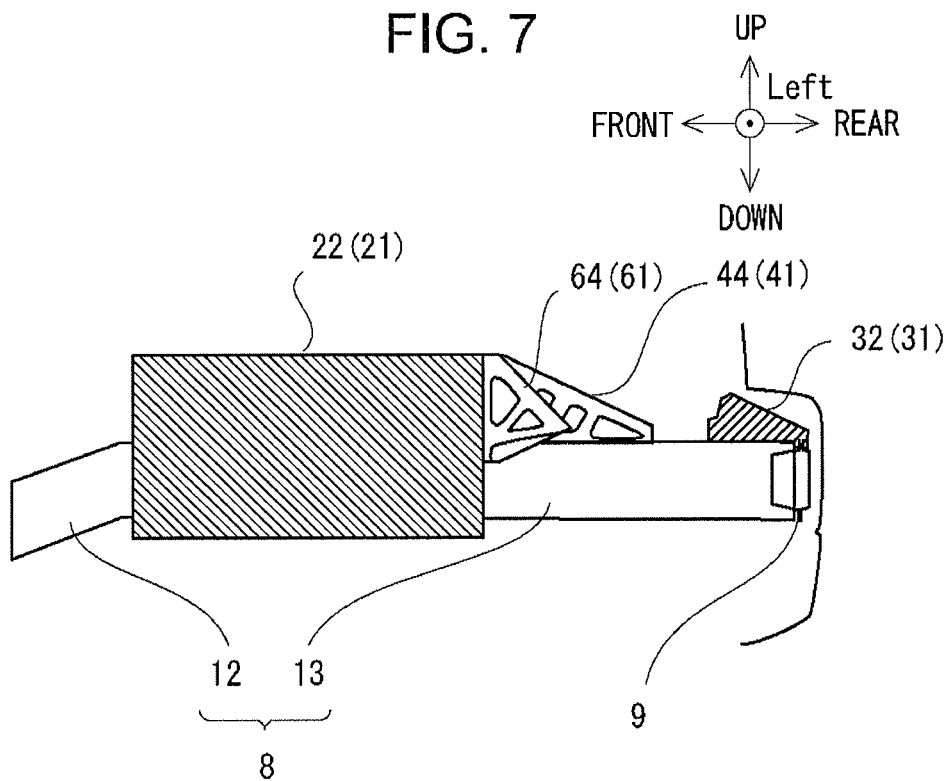
FIG. 7 is a C-C cross-sectional view of the rear side frame and the battery module case of FIG. 2.

FIG. 6 is an explanatory view of the rear side frame 8 and the battery module case 22 of FIG. 2 when viewed from the side. FIG. 7 is a C-C cross-sectional view of the rear side frame 8 and the battery module case 22 of FIG. 2.

As illustrated in FIG. 5, the battery module case 22 has a lower portion 22A in the shape of a rectangular cube that is narrower than the space between the rear extended portions 13 of the pair of the left and right rear side frames 8, and an upper portion 22B that is positioned on the lower portion 22A. The upper portion 22B has the shape of a rectangular cube that is wider than the lower portion 22A, and protrudes to the left and the right from the lower portion 22A. Thus, by forming the battery module case 22 into the shape having a sufficient height based on the shape of the substantially rectangular cube, a large number of battery cells can be disposed densely in the battery module 21.

Portions of the upper portion 22B that protrude to the left and the right from the lower portion 22A are placed on the upper surfaces of the pair of the left and right rear side frames 8. A pair of the left and right protruding portions are screwed to the pair of the left and right rear side frames 8. The battery module case 22 is replaceably mounted in the rear of the vehicle body 1.

In a state in which the battery module case 22 is attached, the rear extended portions 13 of the pair of the left and right rear side frames 8 protrude rearward beyond the battery module case 22. The rear bumper beam 9 is attached to the rear ends of the rear extended portions 13 of the pair of the left and right rear side frames 8.

On the rear bumper beam 9 of the rear frame, the rear end slope member 31 is disposed. The rear end slope member 31 extends in a left and right direction along the rear bumper beam 9. The rear end slope member 31 is provided at a position spaced apart from and behind the battery module 22.

FIG. 8 is a cross-sectional view of the rear end slope member 31 of FIG. 2.

As illustrated in FIG. 8, the rear end slope member 31 has a substantially triangular cross-sectional shape. As illustrated in FIGS. 2, 6, and 7, the base of the substantially triangular cross section is disposed on the upper surface of the rear bumper beam 9. With this, the rear end slope member 31 having the substantially triangular cross section forms a rear end inclined surface 32 that extends from the rear upper edge of the rear bumper beam 9 so as to rise frontward. The rear end inclined surface 32 is formed on the rear bumper beam 9. The rear end inclined surface 32 may be inclined at an angle of, e.g., not more than 45 degrees, or preferably not more than 30 degrees in the front and rear direction of the vehicle body 1.

The rear end inclined surface 32 protrudes above the rear frame up to a height corresponding to about ⅔ of the protrusion of the battery module case 22 above the rear side frame 8.

In addition, as illustrated in FIG. 8, the rear end slope member 31 having the substantially triangular cross section is formed with a flat rear end load receiving surface 33 that extends along an up and down direction at the rear end of the substantially triangular cross section. The lower end of the rear end load receiving surface 33 protrudes below the base of the substantially triangular cross section, and overlaps the rear side of the rear upper end of the rear bumper beam 9. With this, of the rear bumper beam 9 and the rear end slope member 31, it is possible to make a load less likely to act only on the rear bumper beam 9.

The rear end slope member 31 having a bulk structure in such a complicated shape can be integrally formed with a mold by using a fiber reinforced plastic material such as, e.g., engineering plastic. By integrally forming the rear end slope member 31, in the case where the large vehicle body 100 of the truck or the like collides with the rear end slope member 31, the rear end slope member 31 becomes less likely to be deformed.

The side slope members 41 are disposed on the upper surfaces of the rear extended portions 13 of the pair of the left and right rear side frames 8 of the rear frame. Each of the side slope members 41 is disposed adjacent to the rear side of the battery module case 22. The side slope member 41 is provided at a position immediately behind the battery module case 22.

Figure 9:
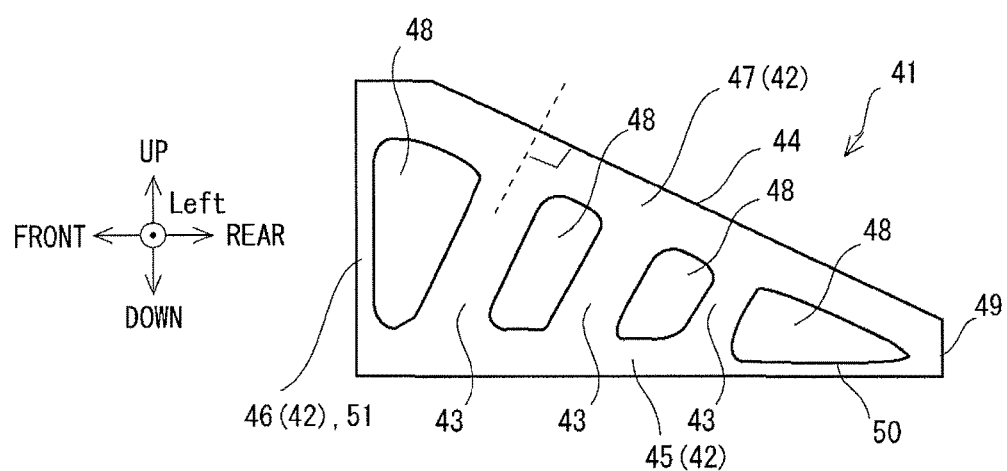
FIG. 9 is a cross-sectional view of a side slope member of FIG. 2.

FIG. 9 is a cross-sectional view of the side slope member 41 of FIG. 2.

As illustrated in FIG. 9, the side slope member 41 has a side triangular frame 42 that forms a substantially triangular cross-sectional shape in a cross section of the vehicle body 1 in the front and rear direction and a plurality of side supports 43 that are disposed inside the side triangular frame 42. The side slope member 41 is formed into a substantially triangular thick plate-like shape.

As illustrated in FIGS. 2, 6, and 7, the side slope member 41 is attached to a position immediately behind the battery module case 22 on the upper surface of the rear side frame 8. With this, the side slope member 41 forms a side inclined surface 44 that extends from the upper surface of the rear side frame 8 so as to rise frontward.

The side inclined surface 44 protrudes above the rear frame up to a position having a height equal to that of the rear end upper edge of the battery module case 22.

As illustrated in FIG. 9, the side triangular frame 42 of the side slope member 41 has a side bottom 45, a side front longitudinal portion 46, and a side inclined surface portion 47. The side bottom 45, the side front longitudinal portion 46, and the side inclined surface portion 47 may be formed into thick plates that can bear a load applied to the side inclined surface portion 47 and may be formed to have high stiffness. For this purpose, each of the side bottom 45 and the side front longitudinal portion 46 may be formed to have a thickness and a strength equal to those of the side inclined surface portion 47 basically.

The side bottom 45 is placed on the rear side frame 8. In this case, the side front longitudinal portion 46 stands on the upper surface of the rear side frame 8 at the front end of the side bottom 45. The side inclined surface portion 47 is obliquely disposed between the upper end of the side front longitudinal portion 46 and the rear end of the side bottom 45. With this, the side slope member 41 forms the frontward rising side inclined surface 44 on the upper surface of the rear side frame 8. The side inclined surface 44 may be inclined at an angle of, e.g., not more than 45 degrees, or preferably not more than 30 degrees in the front and rear direction of the vehicle body 1.

In addition, as illustrated in FIG. 9, the side supports 43 of the side slope member 41 are provided so as to extend between the side inclined surface portion 47 and the side bottom 45. The side supports 43 are disposed at intervals in the front and rear direction. Clearance spaces 48 are formed between the side supports 43. Each side support 43 extends downward and frontward from the side inclined surface portion 47 in a direction perpendicular to the side inclined surface 44. With this, the load perpendicularly acting on the side inclined surface 44 becomes likely to act on the side support 43 in its axial direction. The side support 43 becomes less likely to be ruptured by the load at the time of an offset collision. Note that the side support 43 may also be provided so as to be perpendicular to the side bottom 45.

Further, as illustrated in FIG. 9, at the rear end of the side triangular frame 42 having the substantially triangular cross section, a flat side load receiving surface 49 that extends along the up and down direction is formed.

Furthermore, as illustrated in FIG. 9, in the side bottom 45 as the portion of the side triangular frame 42 other than the side inclined surface portion 47, a bottom fragile portion 50 that is formed to be thinner than the side inclined surface portion 47 is formed. The bottom fragile portion 50 is formed at a portion close to the rear end of the side bottom 45. In addition, the entire side front longitudinal portion 46 is formed to be thinner than the side inclined surface portion 47, and is formed as a front fragile portion 51. Note that the bottom fragile portion 50 or the front fragile portion 51 may also be formed to be narrower than the side inclined surface portion 47. These fragile portions are likely to be ruptured before the other portions are ruptured.

The side slope member 41 having such a complicated shape can be integrally formed with a mold by using a fiber reinforced plastic material such as, e.g., engineering plastic. By integrally forming the side slope member 41, in the case where the large vehicle body 100 of the truck or the like collides with the side slope member 41 in an overriding manner, the side slope member 41 becomes less likely to be deformed. In addition, it is possible to easily set the way of deformation of the side slope member 41.

Further, by forming the side slope member 41 with a resin material that is more fragile than the rear side frame 8 and providing the clearance space 48 in the side slope member 41 such that the internal portion of the side slope member 41 has a hollow structure, in the case where the following vehicle collides with the rear side frame 8 and the rear side frame 8 is compressed in the axial direction (the front and rear direction), it is possible to compress the side slope member 41 in its axial direction and rupture the side slope member 41.

The center slope member 61 is disposed at the center of the rear surface of the battery module case 22. The center slope member 61 is attached to the rear surface of the battery module case 22 so as to extend rearward from the center of the rear surface of the battery module case 22. The center slope member 61 is provided so as to protrude rearward from the battery module case 22 between the pair of the left and right rear side frames 8.

Figure 10:
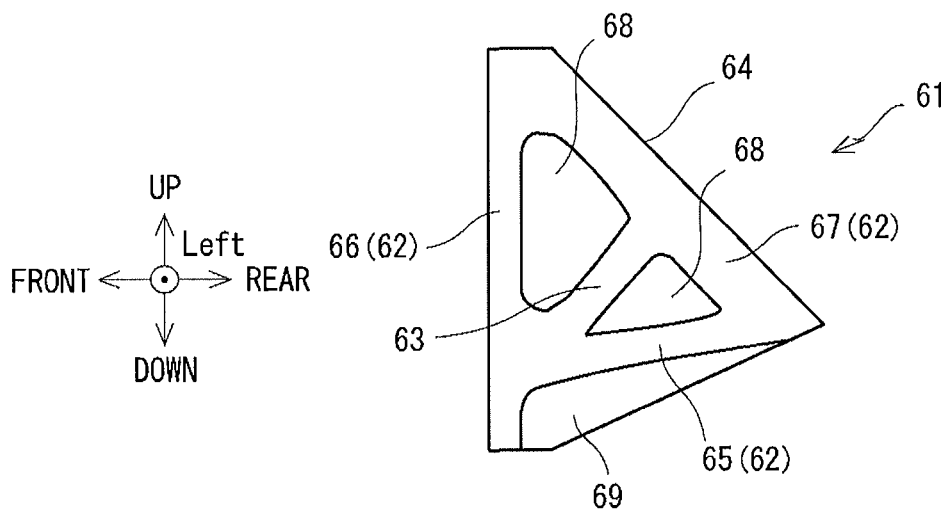
FIG. 10 is a cross-sectional view of a center slope member of FIG. 2.

FIG. 10 is a cross-sectional view of the center slope member 61 of FIG. 2.

As illustrated in FIG. 10, the center slope member 61 has a center triangular frame 62 that forms a substantially triangular cross-sectional shape in the cross section of the vehicle body 1 in the front and rear direction, and a center support 63 that is disposed inside the center triangular frame 62. The center slope member 61 is formed into a thick plate-like shape having a substantially triangular form.

As illustrated in FIGS. 2, 6, and 7, the center slope member 61 forms a center inclined surface 64 that extends so as to rise frontward. The center inclined surface 64 may be inclined at an angle of, e.g., not more than 45 degrees, or preferably not more than 30 degrees in the front and rear direction of the vehicle body 1.

The center inclined surface 64 protrudes above the rear frame up to a position having a height equal to that of the rear end upper edge of the battery module case 22.

As illustrated in FIG. 10, the center triangular frame 62 of the center slope member 61 has a center bottom 65, a center front longitudinal portion 66, and a center inclined surface portion 67. Each of the center bottom 65, the center front longitudinal portion 66, and the center inclined surface portion 67 may be formed to have stiffness with which the center bottom 65, the center front longitudinal portion 66, and the center inclined surface portion 67 can bear a load applied to the center inclined surface portion 67. For this purpose, each of the center bottom 65 and the center front longitudinal portion 66 may be formed to have a thickness and a strength equal to those of the center inclined surface portion 67 basically.

In addition, as illustrated in FIG. 10, the center support 63 of the center slope member 61 is provided so as to extend between the center inclined surface portion 67 and the center bottom 65. The center support 63 is disposed so as to be spaced apart from the center bottom 65 and the center front longitudinal portion 66 in the front and rear direction. A clearance space 68 is formed between the center support 63 and the center bottom 65 or the center front longitudinal portion 66. The center support 63 extends downward and frontward from the center inclined surface portion 67 in a direction perpendicular to the center inclined surface 64. With this, the load that perpendicularly acts on the center inclined surface 64 becomes likely to act on the center support 63 in its axial direction. The center support 63 becomes less likely to be ruptured by the load. Note that the center support 63 may also be provided so as to be perpendicular to the center bottom 65.

Further, as illustrated in FIG. 10, a reinforcement plate 69 is formed under the center bottom 65. With this, the center slope member 61 becomes less likely to be ruptured by the load acting on the center inclined surface 64 in the perpendicular direction. The center support 63 becomes less likely to be ruptured by the load at the time of the offset collision.

The center slope member 61 having such a complicated shape can be integrally formed with a mold by using a fiber reinforced plastic material such as, e.g., engineering plastic. By integrally forming the center slope member 61, in the case where the large vehicle body 100 of the truck or the like collides with the center slope member 61 in the overriding manner, the center slope member 61 becomes less likely to be deformed. In addition, it is possible to easily set the way of deformation of the center slope member 61.

Furthermore, by forming the center slope member 61 with a resin material that is more fragile than the rear side frame 8, forming the structure of the internal portion of the center slope member 61 into the hollow structure with the clearance space 68, and providing the rear apex of the center triangular frame 62 at a position slightly higher than the rear side frame 8 within a range lower than the side inclined surface 44, in the case where the following vehicle collides with the rear side frame 8 and the rear side frame 8 is compressed in the axial direction, it is possible to rupture the center slope member 61 in such a manner as to hit the center triangular frame 62 from below.

Next, a description will be given of an example of impact absorption for protecting the battery module 21 in the case where the large vehicle body 100 of the truck or the like is vertically offset and collides.

Figure 11A:
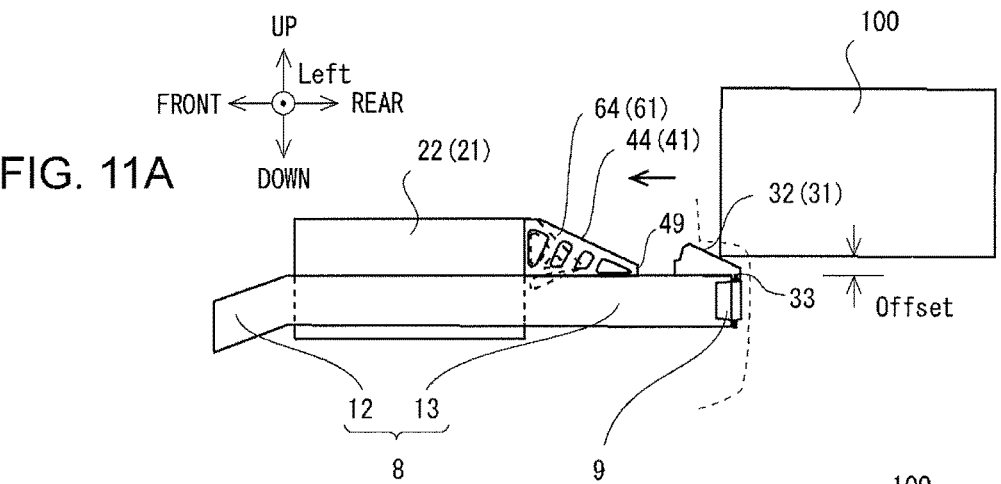
FIGS. 11A to 11C are explanatory views of the deformation of the vehicle body at the time of a vertically offset overriding collision (first stage)
Figure 11B:
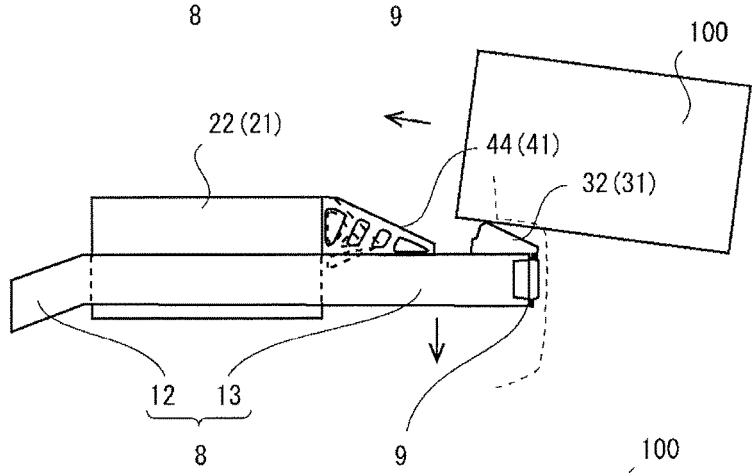
Figure 11C:
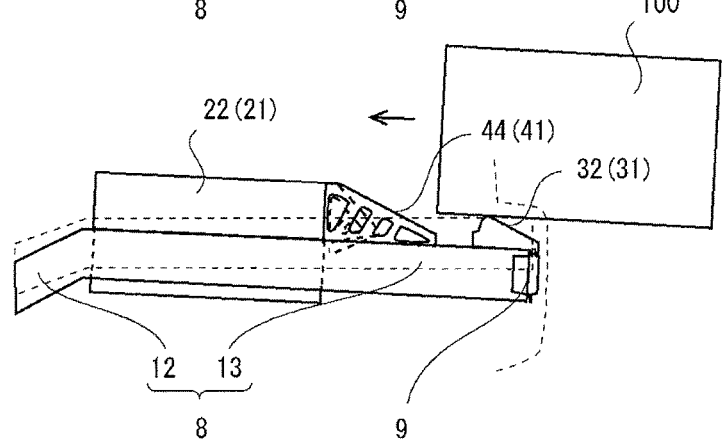

FIGS. 11A to 11C are explanatory views of the deformation of the vehicle body 1 at the time of a vertically offset overriding collision (first stage).

FIGS. 12A to 12C are explanatory views of the deformation of the vehicle body 1 at the time of the vertically offset overriding collision (second stage).

As illustrated in FIG. 11A, in the case where the large vehicle 100 of the truck or the like collides with the vehicle body 1 of FIG. 1, the frame of the colliding large vehicle body 100 collides with the vehicle body 1 of FIG. 1 at a position higher than the rear side frame 8 and the rear bumper beam 9 of the vehicle body 1 of FIG. 1. In this case, the colliding large vehicle body 100 collides with the rear end inclined surface 32 of the rear end slope member 31 without directly abutting on the rear side frame 8 and the rear bumper beam 9.

The large vehicle body 100 having collided with the rear end inclined surface 32 of the rear end slope member 31 gets on the rear end slope member 31 after abutting on the frontward rising rear end inclined surface 32, as illustrated in FIG. 11B. In addition, the large vehicle body 100 having collided therewith pushes down the rear end slope member 31 while being on the rear end slope member 31. With this, the rear bumper beam 9 and the rear side frame 8 are pushed down together with the rear end slope member 31 and, as illustrated in FIG. 11C, the rear side frame 8 is curved downward so as to lower the rear end. In FIG. 11C, the rear side frame 8 is lowered from its original position defined by a dotted line.

Particularly, the rear side frame 8 of FIG. 1 has a structure in which the upper curve 12 extends upward from the attachment portion 11 attached to the side sill 7 and the rear extended portion 13 is extend at the rear of the upper curve 12. Accordingly, the load of the large vehicle body 100 having collided therewith that pushes down the rear end slope member 31 is likely to act on the rear side frame 8 so as to bend the upper curve 12 downward and is likely to bend the upper curve 12 downward such that the entire rear extended portion 13 is directed obliquely downward and rearward.

The rear side frame 8 is bent downward together with the rear end slope member 31 in this manner, and it is thereby possible to absorb the impact of the large vehicle body 100 having collided therewith.

In the case where the large vehicle body 100 having collided therewith does not stop even in the state illustrated in FIG. 11C and is further pushed into the vehicle body 1, the large vehicle body 100 moves frontward on the rear end slope member 31 while pushing down the rear side frame 8 together with the rear side slope member 31, and abuts on the side inclined surface 44 of the side slope member 41, as illustrated in FIG. 12A.

The large vehicle body 100 having abutted on the side inclined surface 44 of the side slope member 41 moves along the side inclined surface 44 and gets on the side slope member 41, as illustrated in FIG. 12B. The large vehicle body 100 pushes down the side slope member 41 while being on the side slope member 41. In addition, as illustrated in FIG. 12C, the large vehicle body 100 having got on the side slope member 41 gets on the battery module case 22. The large vehicle body 100 having got on the side slope member 41 and the battery module case 22 pushes down the side slope member 41 and the battery module case 22. With this, the large vehicle body 100 pushes down the rear side frame 8 together with the battery module case 22. The rear side frame 8 is bent downward, and it is thereby possible to absorb the impact of the large vehicle body 100 having collided therewith.

Note that, in the side slope member 41, as illustrated in FIG. 9, the side supports 43 are disposed along the direction perpendicular to the side inclined surface 44 inside the side triangular frame 42. Therefore, when the large vehicle body 100 gets on the side inclined surface 44 of the side slope member 41, the side slope member 41 is less likely to be damaged.

Thus, in the present implementation, even when the large vehicle body 100 collides with the vehicle body 1 of FIG. 1 in the overriding state in which the large vehicle body 100 is vertically offset, it is possible to absorb the impact resulting from the collision by converting the impact to a force that pushes down the rear side frame 8 and pushing and bending the rear side frame 8 downward.

In addition, the rear side frame 8 is pushed down using the rear end slope member 31 spaced part from the battery module case 22 toward the rear so that the upper surface of the battery module case 22 becomes a frontward rising inclined surface, the large vehicle body 100 that moves into the vehicle body 1 to reach the mounting position of the battery module case 22 is guided upward using the side slope member 41 so that the large vehicle body 100 is placed on the frontward rising upper surface of the battery module case 22, and the rear side frame 8 is further pushed and bent downward together with the battery module case 22, whereby it is possible to prevent the large vehicle body 100 that is pushed into the vehicle body 1 to reach the mounting position of the battery module case 22 from directly colliding with the rear surface of the battery module case 22.

For example, in the case where the large vehicle body 100 abuts on the portion of the rear surface of the battery module case 22 that protrudes above the rear side frame 8, there is a possibility that the battery module case 22 is compressed in the front and rear direction and damaged or the battery module case 22 moves frontward and abuts on the rear seat 6. However, in the present implementation, it is possible to effectively prevent the occurrence of such a situation.

Next, a description will be given of the case where a passenger car having the vehicle body 1 similar to that of FIG. 1 collides with the vehicle body 1 of FIG. 1. Herein, the description will be given by using a full-lap collision in which a vehicle body 101 of the following vehicle collides with the vehicle body 1 of FIG. 1 from right behind the vehicle body 1 as an example.

FIGS. 13A to 13D are explanatory views of the deformation of the rear of the vehicle body 1 at the time of the full-lap collision.

As illustrated in FIGS. 13A to 13D, in the case where the vehicle body 101 similar to that of FIG. 1 collides with the vehicle body 1 of FIG. 1, the colliding vehicle body 101 directly collides with the rear bumper beam 9 of the vehicle body 1 of FIG. 1, as illustrated in FIG. 13A.

Subsequently, as illustrated in FIG. 13B, by the load of the vehicle body 101 having collided therewith, the rear bumper beam 9 and the rear side frame 8 buckle and are deformed. The rear side frame 8 is compressed in the axial direction as the front and rear direction, and absorbs the impact. At this point, the vehicle body 101 abuts on the rear end load receiving surface 33 and the rear end slope member 31 moves frontward together with the rear bumper beam 9. In FIG. 13B, the rear end slope member 31 having moved frontward is separated from the upper surface of the rear bumper beam 9.

In the case where the vehicle body 101 having collided therewith is further pushed into the vehicle body 1, the rear side frame 8 is further compressed in the axial direction, and the vehicle body 101 having collided therewith abuts on the rear end of the side slope member 41, as illustrated in FIG. 13C. The load that compresses the side slope member 41 in the front and rear direction is applied to the side slope member 41. At the rear end of the side slope member 41, the side load receiving surface 49 that extends in the up and down direction is formed. The side slope member 41 has the structure in which the side supports 43 are disposed in the front and rear direction inside the side triangular frame 42. In addition, the bottom fragile portion 50 is formed in the side bottom 45 of the side triangular frame 42, and the side front longitudinal portion 46 is formed as the front fragile portion 51. Therefore, the side triangular frame 42 is easily raptured by being pinched between the colliding vehicle body 101 and the battery module case 22. With the easy rapture of the side triangular frame 42, as illustrated in FIG. 13D, the rear side frame 8 can be further compressed in the axial direction by the load of the vehicle body 101 having collided therewith.

Thus, in the present implementation, the side slope member 41 is easily raptured by the load at the time of the full-lap collision, and do not prevent the rear side frame 8 from being further compressed in the axial direction. Note that the same applies to the center slope member 61. As a result, as illustrated in FIG. 13D, it is possible to secure a distance of compression of the rear side frame 8 in the axial direction that is longer than that illustrated in FIG. 13C. It is also possible to prevent impact absorbing performance obtained by the compression of the rear side frame 8 in the axial direction from being spoiled at the time of the full-lap collision.

Next, a description will be given of an example of the impact absorption for protecting the battery module 21 in the case where the large vehicle body 100 of the truck or the like collides in a state in which the large vehicle body 100 is vertically and laterally offset.

FIGS. 14A to 14D are explanatory views of a laterally offset overriding collision.

As illustrated in FIG. 14A, in the case where the vehicle body 100 collides in the overriding manner in a state in which the vehicle body 100 is laterally offset, the colliding large vehicle body 100 abuts on the rear end slope member 31, moves upward along the rear end inclined surface 32, and gets on the rear end slope member 31 in the state in which the vehicle body 100 is laterally offset, as illustrated in FIG. 14B. The large vehicle body 100 having got on the rear end slope member 31 pushes down the rear side frame 8 together with the rear end slope member 31. The rear side frame 8 is pushed down, and it is thereby possible to absorb the impact.

In the case where the large vehicle body 100 having abutted on the rear end slope member 31 is further pushed into the vehicle body 1, the colliding large vehicle body 100 abuts on the side slope member 41 and the center slope member 61, and gets on the side slope member 41 and the center slope member 61, as illustrated in FIG. 14C. In addition, the large vehicle body 100 gets on the upper surface of the battery module case 22 that is inclined so as to rise frontward. The large vehicle body 100 having got on them pushes down the battery module case 22 and the rear side frame 8 together with the side slope member 41 and the center slope member 61. The rear side frame 8 is pushed down, and it is thereby possible to absorb the impact.

Thus, by providing the center slope member 61 at the center of the rear surface of the battery module case 22 placed on the pair of the left and right rear side frames 8, even in the case where the large vehicle body 100 of the truck or the like is laterally offset and collides in the overriding manner, it is possible to protect the battery module 21.

Thus, in the present implementation, the rear side frame 8 is caused to protrude rearward beyond the battery module case 22, and the rear end slope member 31, the side slope members 41, and the center slope member 61 are provided at the rear of the battery module case 22. In addition, each of the slope members 31, 41, and 61 is disposed on the rear side frame 8 and has the frontward rising inclined surface that protrudes above the rear side frame 8.

Therefore, in the case where the vehicle body (the large vehicle body 100) of the following vehicle collides with the vehicle body 1 in the overriding state in which the vehicle body is vertically offset relative to the rear side frame 8, the vehicle body of the following vehicle collides with the inclined surfaces 32, 44, and 64 that protrude above the rear side frame 8 from the rear, gets on the slope members 31, 41, and 61, and pushes down the rear side frame 8 from above while being on the slope members 31, 41, and 61. The rear side frame 8 is bent downward by being pushed down, and it is thereby possible to absorb the impact at the time of the vertically offset overriding collision before the vehicle body of the following vehicle having collided therewith reaches the mounting position of the battery module case 22.

In addition, in the case where the rear side frame 8 is bent, the battery module case 22 is pushed down together with the rear side frame 8. Subsequently, the upper surface of the battery module case 22 becomes the frontward rising inclined surface, and the load of the vehicle body of the following vehicle having collided therewith in the front and rear direction becomes less likely to directly act on the battery module case 22. The battery module case 22 becomes less likely to be crushed in the front and rear direction at the time of the collision of the vehicle body of the following vehicle. There is a high possibility that the direct collision with the battery module case 22 can be avoided.

Moreover, in the present implementation, the slope members 31, 41, and 61 are provided separately from the rear side frame 8, and the inclined surface is not formed in the rear side frame 8. Therefore, in the case where the vehicle body (the vehicle body 101) of the following vehicle collides with the vehicle body 1 in a state in which the vehicle body is not vertically offset relative to the rear side frame 8, the rear side frame 8 can be compressed in the front and rear direction. The protruding portion of the rear side frame 8 is axially compressed from its original shape at the rear of the battery module case 22, and it is thereby possible to absorb the impact at the time of, e.g., the full-lap collision in which the colliding vehicle body is not vertically offset.

Thus, in the present implementation, since the frontward rising inclined surfaces 32, 44, and 64 that protrude above the rear side frame 8 are formed separately from the rear side frame 8 at the rear of the battery module case 22, in the case where the vehicle body of the following vehicle collides in the state in which the vehicle body is vertically offset relative to the rear side frame 8 or in the case where the vehicle body of the following vehicle collides in, e.g., the full-lap state in which the vehicle body is not vertically offset relative to the rear side frame 8, it is possible to absorb the impact before the vehicle body of the following vehicle reaches the battery module case 22.

The impact absorbing performance in the case where the vehicle body of the following vehicle that is not offset vertically relative to the rear side frame 8 collides is not spoiled, and it is possible to absorb the impact also in the case where the vehicle body of the following vehicle collides in the overriding state in which the vehicle body is vertically offset relative to the rear side frame 8.

As a result, even when the capacity of the battery module case 22 mounted in the rear of the vehicle body 1 is increased and the battery module case 22 is mounted so as to protrude above the rear side frame 8, the vehicle body of the following vehicle is prevented from directly colliding with the upwardly protruding battery module case 22, and the battery module case 22 becomes less likely to be damaged by the direct hit of the vehicle body of the following vehicle.

As a result, in the present implementation, it is possible to relieve the limitation on the capacity of the battery module case 22 while securing the collision safety performance of the battery module case 22 mounted in the rear of the vehicle body 1. It is possible to mount the large-capacity battery module case 22 in the rear of the vehicle body 1 by appropriately utilizing the space in the rear of the vehicle body 1 such as the trunk 4 or the like.

In addition, in the present implementation, the rear end slope member 31 is provided at the position spaced apart from and behind the battery module case 22 on the rear frame including the rear side frames 8 and the rear bumper beam 9 at the rear of the battery module 22, the rear end slope member 31 forms the rear end inclined surface 32 that extends from the rear end upper edge of the rear frame so as to rise frontward, and the rear end inclined surface 32 protrudes above the rear frame.

Therefore, the colliding vehicle body (the large vehicle body 100) of the following vehicle gets on the rear end slope member 31 at the position spaced apart from and behind the battery module case 22, and pushes down the rear side frame 8 together with the rear end slope member 31. It is possible to start to push down the rear side frame 8 and bend it downward before the vehicle body of the following vehicle reaches the battery module case 22. It is possible to effectively absorb the impact of the vehicle body of the following vehicle at the time of the vertically offset collision. In addition, the vehicle body of the following vehicle becomes less likely to reach the battery module case 22. The battery module case 22 becomes less likely to be damaged by the direct hit of the vehicle body of the following vehicle.

Further, in the present implementation, the side slope member 41 is provided on the rear side frame 8 at the rear of the battery module case 22, the side slope member 41 forms the side inclined surface 44 that extends from the upper surface of the rear side frame 8 so as to rise frontward, and the side inclined surface 44 protrudes above the rear frame.

Therefore, the colliding vehicle body (the large vehicle body 100) of the following vehicle gets on the side slope member 41 before reaching the battery module case 22, and pushes down the rear side frame 8 together with the side slope member 41. It is possible to push down the rear side frame 8 and bend it downward before the vehicle body of the following vehicle reaches the battery module case 22. It is possible to effectively absorb the impact of the vehicle body of the following vehicle at the time of the vertically offset collision. In addition, the vehicle body of the following vehicle becomes less likely to reach the battery module case 22. The battery module case 22 becomes less likely to be damaged by the direct hit of the vehicle body of the following vehicle.

In particular, in the present implementation, since the rear end slope member 31 and the side slope member 41 are disposed so as to be disposed in the front and rear direction of the vehicle body 1, it is possible to convert the impact to push-down forces in two stages and effectively absorb the impact before the colliding vehicle body of the following vehicle reaches the battery module case 22. It is possible to avoid the direct collision with the battery module case 22 while using members each having a height equal to or lower than the height of the battery module case 22 as the rear end slope member 31 and the side slope member 41. It is not necessary to use members higher than the battery module case 22 as the rear end slope member 31 and the side slope member 41 in order to avoid the direct collision. It is possible to secure the trunk 4 having a height equal to that of the overhead clearance above the battery module case 22 over the rear end slope member 31 and the side slope member 41.

In addition, in the present implementation, the battery module case 22 protrudes above the upper surfaces of the rear side frames 8, and the side inclined surface 44 of the side slope member 41 protrudes above the rear frame at the height corresponding to the rear end upper edge of the battery module case 22. Therefore, for example, even if the vehicle body of the following vehicle collides so as to reach the battery module case 22, it is possible to guide the vehicle body of the following vehicle upward using the side slope member 41, and make the vehicle body of the following vehicle less likely to directly collide with the battery module case 22 from the rear. The force that compresses the battery module case 22 in the front and rear direction becomes less likely to act on the battery module case 22.

As a result, the battery module case 22 becomes less likely to be compressed in the front and rear direction and damaged even when the vehicle body of the following vehicle moves into the vehicle body to reach the mounting position of the battery module case 22 at the time of the collision in the overriding state while forming the battery module case 22 such that the battery module case 22 has the large-capacity size that allows the battery module case 22 to protrude above the rear side frame 8. In addition, since the battery module case 22 is not pushed frontward, it becomes possible to prevent a user seated in front of the battery module case 22 from being affected.

Further, in the present implementation, the center slope member 61 is provided so as to protrude rearward beyond the battery module case 22 between the rear side frames 8, the center slope member 61 forms the center inclined surface 64 that extends so as to rise frontward, and the center inclined surface 64 protrudes above the rear frame.

Therefore, the colliding vehicle body (the large vehicle body 100) of the following vehicle gets on the center slope member 61 before reaching the battery module case 22, and pushes down the battery module case 22 and the rear side frame 8 together with the center slope member 61. It is possible to push down the rear side frame 8 and bend it downward before the vehicle body of the following vehicle reaches the battery module case 22. It is possible to effectively absorb the impact of the vehicle body of the following vehicle at the time of the vertically and laterally offset collision. In addition, the vehicle body of the following vehicle becomes less likely to reach the battery module case 22. The battery module case 22 becomes less likely to be damaged by the direct hit of the vehicle body of the following vehicle.

In particular, since the rear end slope member 31 and the center slope member 61 are disposed so as to be disposed in the front and rear direction of the vehicle body 1, even in the case where the vehicle body of the following vehicle is laterally offset and collides in the overriding manner, it is possible to effectively absorb the impact before the vehicle body of the following vehicle reaches the battery module case 22. It is possible to convert the impact to the push-down forces in two stages and effectively absorb the impact. It is possible to avoid the direct collision with the battery module 22 while using members each having a height equal to or lower than the height of the battery module case 22 as the rear end slope member 31 and the center slope member 61.

It is not necessary to use the member higher than the battery module case 22 as the rear end slope member 31 or the center slope member 61 in order to avoid the direct collision. It is possible to secure the trunk 4 having a height equal to that of the overhead clearance above the battery module case 22 over the rear end slope member 31 and the center slope member 61.

In addition, in the present implementation, the battery module case 22 protrudes above the upper surfaces of the rear side frames 8, and the center inclined surface 64 of the center slope member 61 protrudes above the rear frame at the height corresponding to the rear end upper edge of the battery module case 22. Therefore, even if the vehicle body of the following vehicle collides so as to reach the battery module case 22, it is possible to guide the vehicle body of the following vehicle upward using the center slope member 61 and make the vehicle body of the following vehicle less likely to directly collide with the battery module case 22 from the rear. The force that compresses the battery module case 22 in the front and rear direction becomes less likely to act on the battery module case 22.

As a result, the battery module case 22 becomes less likely to be compressed in the front and rear direction and damaged even when the vehicle body of the following vehicle moves into the vehicle body to reach the mounting position of the battery module case 22 at the time of the collision in the overriding state while forming the battery module case 22 such that the battery module case 22 has the large-capacity size that allows the battery module case 22 to protrude above the rear side frame 8. In addition, since the battery module case 22 is not pushed frontward, it becomes possible to prevent a user seated in front of the battery module case 22 from being affected.

Further, in the present implementation, each of the slope members 31, 41, and 61 is formed of a resin material that is more fragile than the rear side frame 8. Furthermore, for example, the side slope member 41 has the side triangular frame 42 that includes the side inclined surface portion 47 in which the frontward rising inclined surface is formed and forms the substantially triangular cross-sectional shape in the cross section of the vehicle body 1 in the front and rear direction, and the side supports 43 that extend downward or downward and frontward from the side inclined surface portion 47 and couple the side inclined surface portion 47 of the frame and the other portions. Therefore, it is possible to form the slope member 41 with the resin material such that the slope member 41 can bear the load in the case where the vehicle body of the following vehicle having collided therewith gets on the side inclined surface portion 47.

Moreover, in the present implementation, the side supports 43 are disposed at intervals in the front and rear direction inside the side triangular frame 42. Therefore, in the case where the rear side frame 8 is deformed so as to be compressed in the axial direction due to, e.g., the full-lap collision or the like, it is possible to deform the side slope member 41 without inhibiting the deformation of the rear side frame 8. It is possible to prevent the side slope member 41 from inhibiting the impact absorbing performance obtained by the compression of the rear side frame 8 in the axial direction.

Note that the same applies to the center slope member 61.

In addition, in the present implementation, for example, the side slope member 41 is formed with the side load receiving surface 49 that extends along the up and down direction of the vehicle body 1 at the rear end of the side triangular frame 42. Therefore, in the case where the rear side frame 8 is deformed so as to be compressed in the axial direction due to, e.g., the full-lap collision or the like, it is possible to appropriately cause the load that compresses the side slope member 41 in the front and rear direction to act on the side slope member 41. As a result, the side slope member 41 is easily broken. It is possible to prevent the side slope member 41 from inhibiting the impact absorbing performance obtained by the compression of the rear side frame 8 in the axial direction.

Further, in the present implementation, the side slope member 41 is formed with the bottom fragile portion 50 and the front fragile portion 51 in the portion of the side triangular frame 42 other than the side inclined surface portion 47. Therefore, in the case where the rear side frame 8 is deformed so as to be compressed in the axial direction due to, e.g., the full-lap collision or the like, the side slope member 41 is easily broken with the fragile portions 50 and 51. It is possible to prevent the side slope member 41 from inhibiting the impact absorbing performance obtained by the compression of the rear side frame 8 in the axial direction.

Moreover, even in the case where a large load with which the shape of the side slope member 41 cannot be maintained acts on the side slope member 41 at the time of the vertically offset overriding collision, the fragile portions 50 and 51 are broken, and the side inclined surface portion 47 becomes less likely to be broken in the side slope member 41. Even in the state in which the side slope member 41 is broken, it is possible to maintain the side inclined surface portion 47 and the function of guiding the vehicle body of the following vehicle upward. In particular, as in the present implementation, by forming the side front longitudinal portion 46 of the side triangular frame 42 of the side slope member 41 as a fragile portion, the side slope member 41 can be bent downward in the case where the side slope member 41 is broken. It is possible to maintain the frontward rising inclination of the side inclined surface portion 47. In addition, as in the present implementation, by forming the rear end side of the side bottom 45 of the side triangular frame 42 of the side slope member 41 as a fragile portion, in the case where the side slope member 41 is broken, the side slope member 41 is bent downward. It is possible to maintain the frontward rising inclination of the side inclined surface portion 47. In spite of the fact that the fragile portions 50 and 51 are provided in the side slope member 41 in order to improve the effect of not inhibiting the impact absorbing performance of the rear side frame 8 in the full-lap collision or the like, it is possible to maintain the capability of guiding of the side slope member 41 using the side inclined surface 44 at the time of the vertically offset overriding collision.

The implementation described above is an example of the preferred implementation of the present invention, and the present invention is not limited thereto. Various modifications or changes can be made without departing from the gist of the invention.

For example, in the above implementation, the side slope member 41 has the side triangular frame 42, the side supports 43, and the side load receiving surface 49, and is formed with the fragile portions 50 and 51.

In addition to this, for example, the side slope member 41 may only include any of the constituent elements.

Further, at least one of the center slope member 61 and the rear end slope member 31 may include the constituent elements similar to those of the side slope member 41.

However, the rear end slope member 31 that is provided so as to be spaced apart from and behind the battery module 21 and absorbs the impact in the first stage preferably has the bulk shape as in the above implementation. With this, the rear end slope member 31 becomes less likely to be damaged by the impact at the time of the collision, and the effect of making the initial movement at the time of the overriding collision into the above-described movement is obtained.

In the above implementation, the rear end slope member 31, the side slope member 41, and the center slope member 61 are used.

In addition to this, for example, only a part of the rear end slope member 31, the side slope member 41, and the center slope member 61 may also be used.

Further, in addition to this, for example, a slope member other than the rear end slope member 31, the side slope member 41, and the center slope member 61 may also be used.

Furthermore, the center slope member 61 may also be formed to be wider. In particular, the center slope member 61 may be formed to be wider so as to be integrated with the left and right side slope members 41. With this, it is possible to appropriately cope with various types of the overriding collisions having different offset amounts in the left and right direction.

However, the slope member provided immediately behind the battery module 21 is preferably divided into multiple members as in the above implementation in which the slope member immediately behind the battery module 21 is divided into the center slope member 61 and the left and right side slope members 41. With this, the slope member immediately behind the battery module 21 becomes less likely to hinder the axial compression of the rear side frame 8 at the time of, e.g., the full-lap collision. It becomes easy to increase an axial compression distance.

In the above implementation, the entire slope members 31, 41, and 61 are disposed at the rear of the rear surface of the battery module case 22.

In addition to this, for example, the slope members 31, 41, and 61 may also be disposed so as to extend rearward beyond the battery module case 22 from portions at the front of the rear surface of the battery module case 22.

The invention claimed is:

1. A protection structure of a battery module mounted in the rear of a vehicle body comprising:
    rear side frames that extend rearward in the vehicle body, and are disposed in a width direction of the vehicle body;
    a rear bumper beam that couples rear ends of the rear side frames and extends in the width direction of the vehicle body; and
    one or a plurality of slope members including a first slope member disposed at the rear of the battery module, wherein
    the battery module is attached to the rear side frames such that the battery module lays across the rear side frames and the rear side frames protrude rearward beyond the battery module,
    the first slope member is provided at a position spaced apart from and behind the battery module, on a rear frame that includes the rear side frames and the rear bumper beam at the rear of the battery module, and forms a first inclined surface that extends from an upper side of a rearmost edge of the rear frame so as to rise frontward, and
    the first inclined surface protrudes above the rear frame, wherein a top surface of the battery module extending over a length between the rear side frames is positioned at a height not below upper surfaces of the rear side frames.

2. The protection structure of a battery module mounted in the rear of a vehicle body according to claim 1, wherein
the one or the plurality of slope members includes a second slope member,
the second slope member is provided on one or more upper surfaces of the rear side frames behind the battery module, and forms a second inclined surface that extends from the one or more upper surfaces of the rear side frames so as to rise frontward, and
the second inclined surface protrudes above the rear frame.

3. The protection structure of a battery module mounted in the rear of a vehicle body according to claim 2, wherein
the one or the plurality of slope members includes a third slope member,
the third slope member is provided between the rear side frames so as to protrude rearward from the rear of the battery module, and forms a third inclined surface that extends so as to rise frontward, and
the third inclined surface protrudes above the rear frame.

4. The protection structure of a battery module mounted in the rear of a vehicle body according to claim 3, wherein
the second slope member includes a resin material that is more fragile than at least one of the rear side frames, and the second slope member comprises:
a frame that includes an inclined surface portion in which the second inclined surface is formed; and
a plurality of supports that extend downward or downward and frontward from the inclined surface portion and couple the inclined surface portion of the frame with another portion of the frame, and
the plurality of supports are disposed at one or more internals in the front and rear direction of the vehicle body inside the frame.

5. The protection structure of a battery module mounted in the rear of a vehicle body according to claim 4, wherein
at least one slope member is formed with a frame that forms a substantially triangular cross-sectional shape, the frame including a load receiving surface that extends along an up and down direction of the vehicle body at a rear end of the frame, the at least one slope member being the first slope member, the second slope member, or the third slope member.

6. The protection structure of a battery module mounted in the rear of a vehicle body according to claim 5, wherein
the frame includes a fragile portion at a portion other than the inclined surface portion.

7. The protection structure of a battery module mounted in the rear of a vehicle body according to claim 4, wherein
at least one slope member is formed with a frame that forms a substantially triangular cross-sectional shape, the frame including a fragile portion at a portion other than the inclined surface portion, the at least one slope member being the first slope member, the second slope member, or the third slope member.

8. The protection structure of a battery module mounted in the rear of a vehicle body according to claim 3, wherein
the battery module protrudes above the upper surfaces of the rear side frames, and
the third inclined surface of the third slope member protrudes above the rear frame at a height corresponding to a rear end upper edge of the battery module.

9. The protection structure of a battery module mounted in the rear of a vehicle body according to claim 8, wherein
the second slope member includes a resin material that is more fragile than at least one of the rear side frames, and the second slope member comprises:
a frame that includes an inclined surface portion in which the second inclined surface is formed; and
a plurality of supports that extend downward or downward and frontward from the inclined surface portion and couple the inclined surface portion of the frame with another portion of the frame, and
the plurality of supports are disposed at one or more intervals in the front and rear direction of the vehicle body inside the frame.

10. The protection structure of a battery module mounted in the rear of a vehicle body according to claim 9, wherein
at least one slope member is formed with a frame that forms a substantially triangular cross-sectional shape, the frame including a fragile portion at a portion other than the inclined surface portion, the at least one slope member being the first slope member, the second slope member, or the third slope member.

11. The protection structure of a battery module mounted in the rear of a vehicle body according to claim 9, wherein
at least one slope member is formed with a frame that forms a substantially triangular cross-sectional shape, the frame including a load receiving surface that extends along an up and down direction of the vehicle body at a rear end of the frame, the at least one slope member being the first slope member, the second slope member, or the third slope member.

12. The protection structure of a battery module mounted in the rear of a vehicle body according to claim 11, wherein
the frame includes a fragile portion at a portion other than the inclined surface portion.

13. The protection structure of a battery module mounted in the rear of a vehicle body according to claim 3, wherein,
in a front and rear direction of the vehicle body, the third slope member is positioned rearward of the battery module and forward of the first slope member.

14. The protection structure of a battery module mounted in the rear of a vehicle body according to claim 2, wherein
the battery module protrudes above the upper surfaces of the rear side frames, and
the second inclined surface of the second slope member protrudes above the rear frame at a height corresponding to a rear end upper edge of the battery module.

15. The protection structure of a battery module mounted in the rear of a vehicle body according to claim 2, wherein
the second slope member includes a resin material that is more fragile than at least one of the rear side frames, and the second slope member comprises:
a frame that includes an inclined surface portion in which the second inclined surface is formed; and
a plurality of supports that extend downward or downward and frontward from the inclined surface portion and couple the inclined surface portion of the frame with another portion of the frame, and
the plurality of supports are disposed at one or more intervals in the front and rear direction of the vehicle body inside the frame.

16. The protection structure of a battery module mounted in the rear of a vehicle body according to claim 2, wherein,
in a front and rear direction of the vehicle body, the second slope member is positioned rearward of the battery module and forward of the first slope member.

17. The protection structure of a battery module mounted in the rear of a vehicle body according to claim 1, wherein
the first slope member includes a resin material that is more fragile than at least one of the rear side frames, and comprises:

a frame that includes an inclined surface portion in which the first inclined surface is formed; and a plurality of supports that extend downward or downward and frontward from the inclined surface portion and couple the inclined surface portion of the frame with another portion of the frame, and the plurality of supports are disposed at one or more intervals in the front and rear direction of the vehicle body inside the frame.

18. The protection structure of a battery module mounted in the rear of a vehicle body according to claim 1, wherein, in a front and rear direction of the vehicle body, the first slope member is positioned at a location that is closer to the bumper beam than to the battery module.

19. The protection structure of a battery module mounted in the rear of a vehicle body according to claim 1, wherein the first inclined surface is positioned internally of an outer body panel of the vehicle body.

20. The protection structure of a battery module mounted in the rear of a vehicle body according to claim 1, wherein the battery module comprises a first portion that is disposed on an upper surface of a first of the rear side frames and a second portion that is disposed on an upper surface of a second of the rear side frames, the first slope member is positioned behind the first and second portions of the battery module.

* * * * *